United States Patent [19]

Higuchi

[11] Patent Number: 5,235,479
[45] Date of Patent: Aug. 10, 1993

[54] DIGITAL VIDEO TAPE RECORDER WITH TRACKING CENTRAL CIRCUIT FOR CAUSING POSITIONS OF EXISTING RECORDED TRACK AND NEWLY RECORDED TRACK TO COINCIDE DURING EDITING

[75] Inventor: Shigemitsu Higuchi, Fujisawa, Japan
[73] Assignee: Hitachi, Ltd., Tokyo, Japan
[21] Appl. No.: 424,198
[22] Filed: Oct. 19, 1989
[30] Foreign Application Priority Data
  Oct. 21, 1988 [JP] Japan .................. 63-263907
[51] Int. Cl.$^5$ .............................................. G11B 5/584
[52] U.S. Cl. .................................................. 360/77.13
[58] Field of Search ............... 360/77.12, 77.13, 77.14, 360/77.15, 77.16, 77.17

[56] References Cited

U.S. PATENT DOCUMENTS

| | | | |
|---|---|---|---|
| 4,443,823 | 4/1984 | Sakamoto | 360/77.16 |
| 4,827,361 | 5/1989 | Yoshioka | 360/77.14 |
| 4,984,104 | 1/1991 | Takahashi et al. | 360/77.14 |
| 5,025,329 | 6/1991 | Taniguchi et al. | 360/77.16 |

OTHER PUBLICATIONS

Inagaki, "Design Considerations for the D-2 NTSC Composite DVTR", Institute of Television Engineers of Japan Technical Report, vol. 11, No. 24, pp. 13-18, Oct. 1988.
Kaku et al., "Mechanical Considerations for Composite Digital VCR", Preprint No. 130-19 presented at the 130th SMPTE Technical Conference, Oct. 15-19, 1988.

Primary Examiner—Joseph L. Dixon
Assistant Examiner—David L. Robertson
Attorney, Agent, or Firm—Antonelli, Terry, Stout & Kraus

[57] ABSTRACT

A digital video tape recorder which is equipped with means to detect a recording head position on a recorded track for play back, means to control the recording head to correctly track the recorded track on the basis of the detected recording head position, and means to retain the correct tracking state during recording, thereby preventing degradation of images in a joint recording portion by guaranteeing that the position of the recorded track and the position of a newly recorded track coincide.

6 Claims, 4 Drawing Sheets

DIGITAL VIDEO TAPE RECORDER WITH TRACKING CENTRAL CIRCUIT FOR CAUSING POSITIONS OF EXISTING RECORDED TRACK AND NEWLY RECORDED TRACK TO COINCIDE DURING EDITING

BACKGROUND OF THE INVENTION AND RELATED ART STATEMENT

This invention relates to a digital video tape recorder equipped with separate heads for recording and playing back digital data.

A digital video tape recorder, which converts video signals to digital signals instead of analog signals for recording and playing back the video signals, is being realized. An apparatus on the basis of the recording format indicated in "Design Consideration for the D-2 NTSC Composite Digital VTR", Institute of Television Engineers of Japan Technical Report, Vol. 11, No. 24, pp. 13 to 18 (Oct. 1987) is an example of such a recorder. The recording format of this digital video tape recorder (DVTR) comprises helical tracks (1-channel digital video data and 4-channel digital audio data are recorded) and 3-channel linear tracks as shown in FIG. 3. Digital data in each field is divided into six tracks for recording. A configuration example of a cylinder and heads to realize such a recording format is indicated in "Mechanical Considerations for Composite Digital VCR" (130th SMPTE Technical Conference, October 15-19, 1988, Preprint No. 130-19). FIG. 4 shows the example. Four recording heads REC1 to REC4 are used for recording digital data for each two channels, and a field is recorded for each 1.5 revolutions of the cylinder. The heads PB1 to PB4 are used for play back. The recording heads and play back heads are separately provided (1) to improve the recording reliability by allowing the play back heads to read signals recorded by the recording heads and by allowing for simultaneous monitoring of the recorded signals and (2) to improve the recording and play back reliability by optimizing the characteristics of the recording heads and play back heads.

Examination shows that, for a combination of a metal tape and ferrite heads, it is required to set the gap length between the recording heads to 0.6 to 1.0 μm and the gap length between the play back heads to 0.2 to 0.4 μm. Therefore, it is difficult due to gap loss to read recorded data perfectly by using the recording heads, and the recording heads are required to be used only for recording data. As a play back head, a movable head is suited for noiseless slow motion play back.

Such a recording head, which is used for play back, can generate a play back output allowing for detection of the output level.

OBJECTS AND SUMMARY OF THE INVESTION

Problems caused by a digital video tape recorder with the configuration of a cylinder and heads on the basis of the above art are as follows. Since the play back heads are movable, the play back heads can always be set in the correct tracking state for tracks to be played back. Since the recording heads have the configuration of performing tracking and recording with the predetermined mechanism precision, the continuity of the newly recorded track position and of the track position of the recorded portion in the joint recording portion for editing such as inserting edit or assembling edit is not guaranteed. This is caused by a difference of the recorded track position due to a change with time or a change in temperature. In the joint recording portion, therefore, a recorded track is erased by new data or an old track to be erased is left partially unerased, causing incorrect play back data or degradation of play back images at the joint.

The objects of the present invention are to solve the above problems of a digital video tape recorder with the above configuration of a cylinder and heads and to provide a digital video tape recorder which causes no degradation of images at the joint.

To accomplish the above objects, the present invention provides a means for detecting the position of the recording head on a track during play back, a means for controlling the recording head to correctly track the recorded track by the output thereof, and a means for retaining the state during recording.

In the digital video tape recorder of the present invention, the continuity of the position of the recorded track and the position of a track to be newly recorded is guaranteed because the above means allows the recording head to track correctly the recorded track during play back and the state to be retained in the recording state to solve the above problems.

DETAILED DESCRIPTION OF PREFERRED EMBODIMENTS

Figure 1:
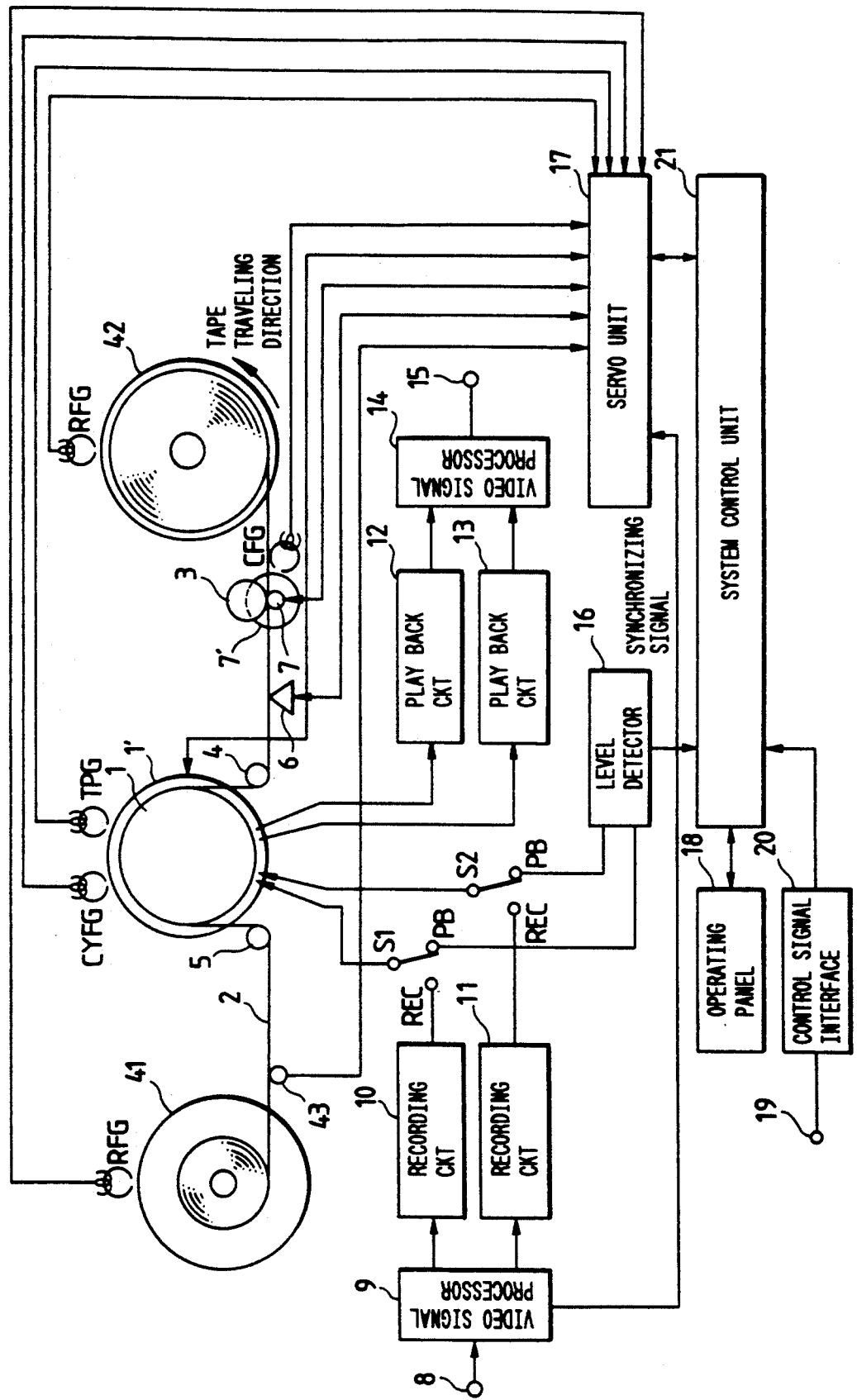
FIG. 1 is a block diagram indicating an embodiment of the digital video tape recorder of the present invention.
Figure 2:
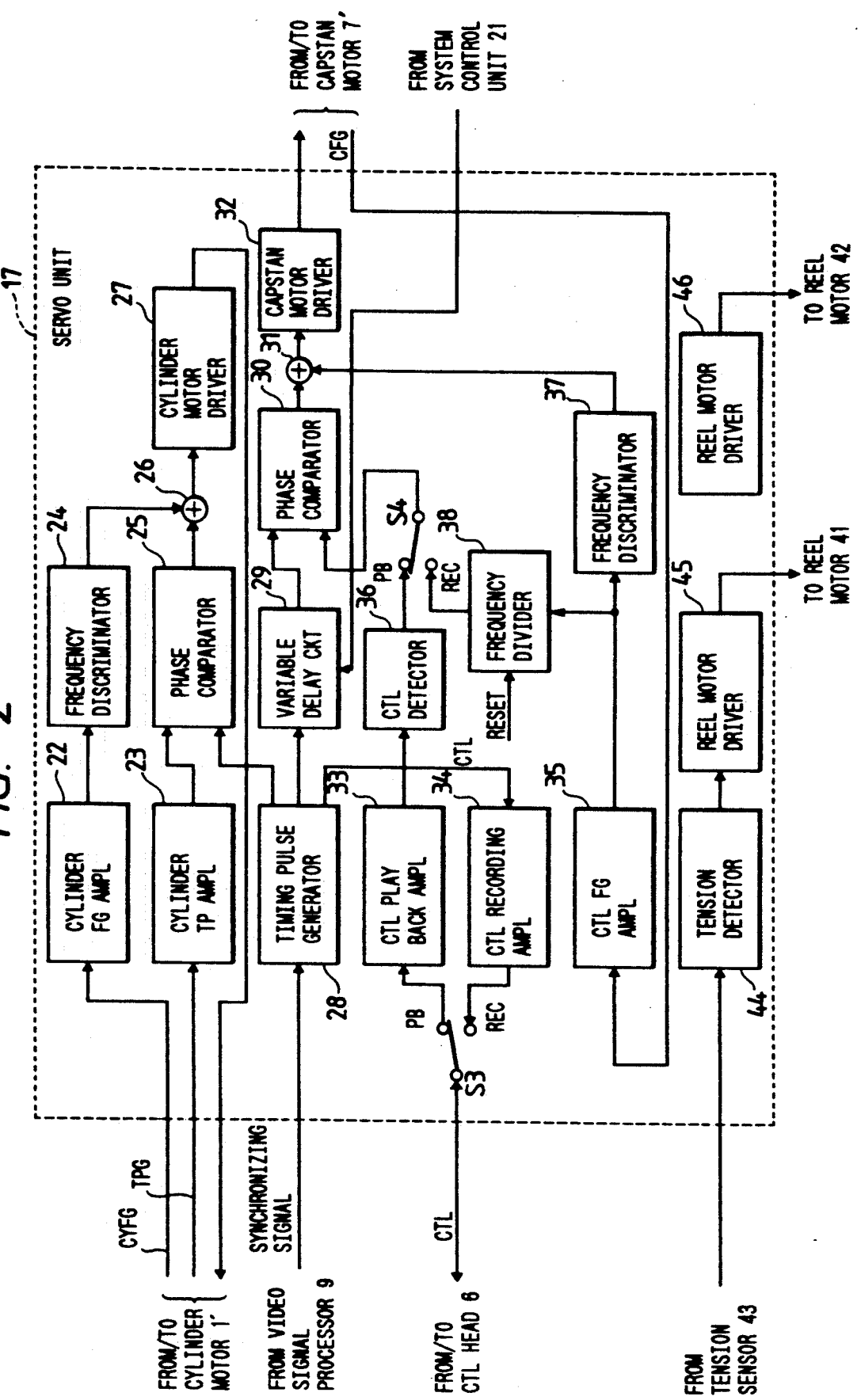
FIG. 2 is a block diagram indicating a configuration example of a servo unit 17.

Descriptions of an embodiment of the present invention follow with reference to the accompanying drawings. FIG. 1 is an entire block diagram of the digital video tape recorder of the present invention and FIG. 2 is a detailed block diagram of the servo unit 17 of FIG. 1.

Figure 3:
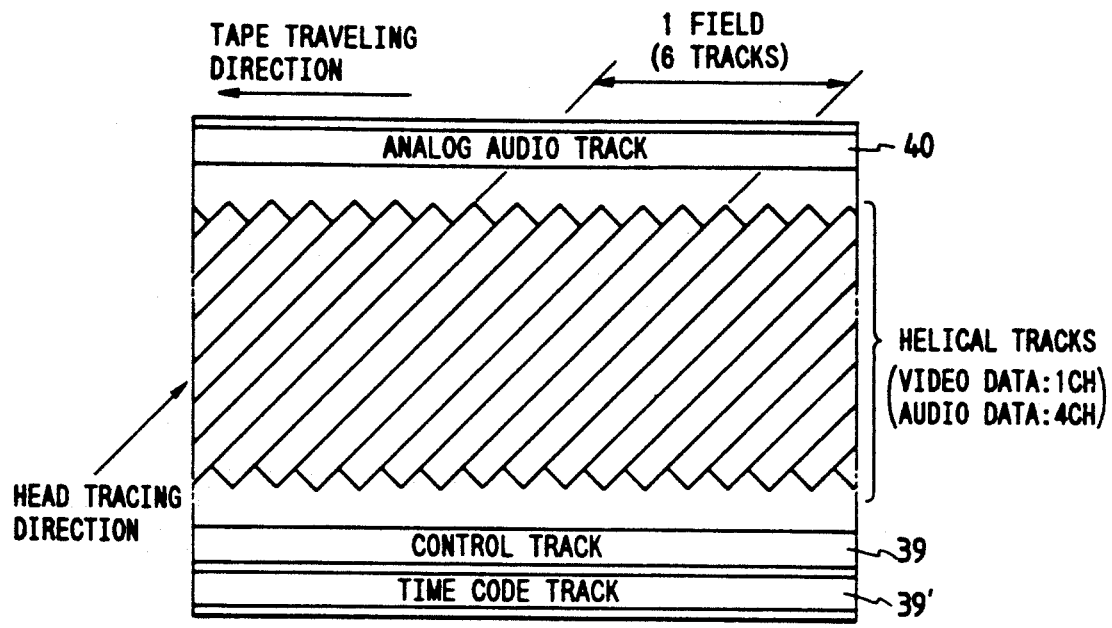
FIG. 3 illustrates the recording format.
Figure 4:
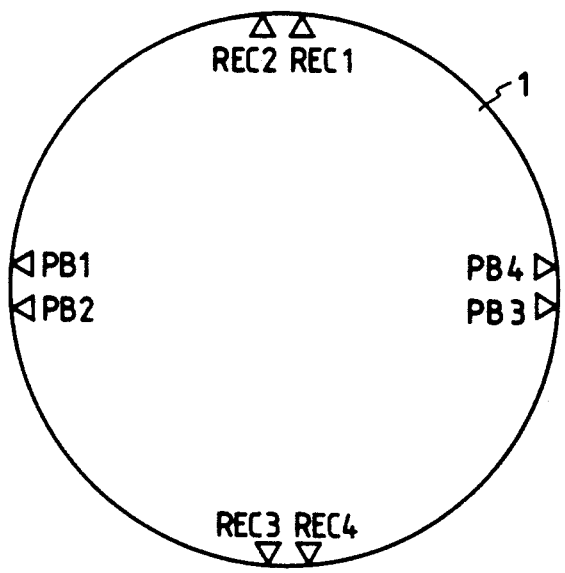
FIG. 4 is a layout drawing of a cylinder and heads which can be used in the present invention.

In FIG. 1, a magnetic tape 2 is wound around a cylinder 1 using guides 4 and 5. As described in FIG. 4, the recording heads REC1 to REC4 and the play back heads PB1 to PB4 are mounted to the cylinder 1. The cylinder 1 is rotated by a cylinder motor 1'. A cylinder frequency generator signal CYFG for indicating the number of revolutions of the motor and also a tachometer pulse signal TPG for indicating the rotation phase of the cylinder are outputted from the cylinder motor 1'. A control head 6 for recording or playing back a control pulse on a control track 39 shown in FIG. 3 is provided on the tape path.

The tape is driven by a capstan 7 of a capstan unit (comprising the capstan 7, a capstan motor 7' for rotating said capstan, and a capstan FG sensor for detecting the number of revolutions of the motor) and a pinch roller 3. The tape is unwound from or wound around the reel by a reel motor 41 or 42. A tape tension sensor 43 is provided on the tape path to control the reel motors so that the tape travels at an appropriate tension.

The video signal recording system comprises a signal input terminal 8, a video signal processing circuit 9, and recording circuits 10 and 11. A video signal inputted to the signal input terminal 8, for example, on the basis of the NTSC television method is clamped and filtered through a low pass filter (LPF) with a bandwidth of about 6 MHz and converted from analog data to digital data at a frequency 4 times of that of a color sub-carrier, in the video signal processing circuit 9.

In addition, said digital data is divided into two channels to follow the above recording format, sent to the record circuits 10 and 11, shuffled, added with parity data and modulated ($M^2$ modulation in this example) for error correction, amplified for driving the heads, sent to the recording heads REC1 to REC4 on the cylinder 1, and recorded on the tape.

The recording heads REC1 and REC3, and REC2 and REC4 are located so that said recording heads face each other (at 180°) respectively at the same azimuth, and the effective tape winding angle is 180° or less. Therefore, the recording format of FIG. 3 can be realized by a recording system of two channels. During recording, output of the servo unit 17 allows the control head 6 to record control signals on the control track 39 of the tape.

The play back system comprises play back circuits 12 and 13, a video signal processing circuit 14, and a video output terminal 15. Signals from the play back heads PB1 to PB4 are amplified and equalized in waveform by the play back circuits 12 and 13, and modulated ($M^2$ modulation in this example), and the recorded digital data is fetched. In addition, said recorded digital data is subjected to error correction using a parity signal, deshuffled, and sent to the video signal processing circuit 14. The data of 2 channels are combined of by the video signal processing circuit 14, added with a synchronizing signal, and converted from analog to digital, and the video signal is outputted to the signal output terminal 15.

Next, the servo unit 17 will be described. The servo unit 17 appropriately controls the cylinder 1 and the capstan unit, and also controls the tape position and the head position to follow the requested recording format. FIG. 2 is a detailed block diagram of the servo unit 17. As to control of the cylinder 1, a timing pulse signal from a timing pulse generator 28, which is generated on the basis of a synchronizing signal outputted from the video signal processing circuit 9, and the TPG signal from the cylinder motor 1', which is amplified by a cylinder TP amplifier 23, are compared in phase by a phase comparator 25, and a voltage in proportion to the phase difference is outputted. The CYFG signal from the cylinder motor 1' is amplified by a cylinder FG amplifier 22 and discriminated in frequency by a frequency discriminator 24, and a difference from the target value is outputted as a voltage. The output of the phase comparator 25 and the output of the frequency discriminator 24 are added by an adder 26, and the addition result is sent to a cylinder motor driver 27, and the cylinder motor 1' is driven. Since this drive is controlled so that the phase difference and the frequency are fixed values, the cylinder 1 rotates in synchronization with an input video signal.

The drive system of the capstan motor 7' for recording differs from that for play back. For recording, a control signal generated by the timing pulse generator 28 is amplified by a control record amplifier 34, and recorded on the control track 39 of the tape by the control head 6 via a switch 53. The capstan motor 7' is controlled by a capstan FG signal CFG so that said motor 7' rotates at a constant speed. First, the output pulse of the timing pulse generator 28 is sent via a variable delay circuit 29 to a phase comparator 30. The CFG signal from the capstan motor 7' is amplified by a control FG amplifier 35, divided by a frequency divider 38, and sent to the phase comparator 30 via a switch S4. The phase comparator 30 outputs a voltage in proportion to the phase difference of both signals, and the phase loop of the servo system is configured using this output voltage. The output of the control FG amplifier 35 is discriminated in frequency by a frequency discriminator 37, and a difference from the target value is outputted as a voltage. The speed loop is configured using this output voltage. The output of the phase comparator 30 and the output of the frequency discriminator 37 are added by an adder 31, and the addition output controls the capstan motor 7' via a capstan motor driver 32. Since this control is performed so that the phase difference and the frequency are predetermined values, the capstan 7 rotates in synchronization with an input video signal.

For play back, the control signal recorded on the control track 39 is read by the control head 6, amplified by a control play back amplifier 33 via the switch S3, and separated by a control detection circuit 36. Since this play back control signal is outputted to the phase comparator 30 via the switch S4, and the control signal outputted from the tape 2 and the reference signal are controlled so that both signals have fixed phases, the tape 2 travels in synchronization with an input video signal. As a result, the cylinder rotation and the tape travel are synchronized with the input video signal, and the head traces a predetermined track.

A reset of the frequency divider 38 is performed by output of the control detection circuit 36 or output of the variable delay circuit 29. Even if the operation of the servo system is switched from the play back state to the recording state by this reset, the output of the control detection circuit 36 and the output of the frequency divider 38 become a continuous signal, and the capstan 7 rotates in the same way as with play back, and the continuity of the track position is retained.

Figure 6:
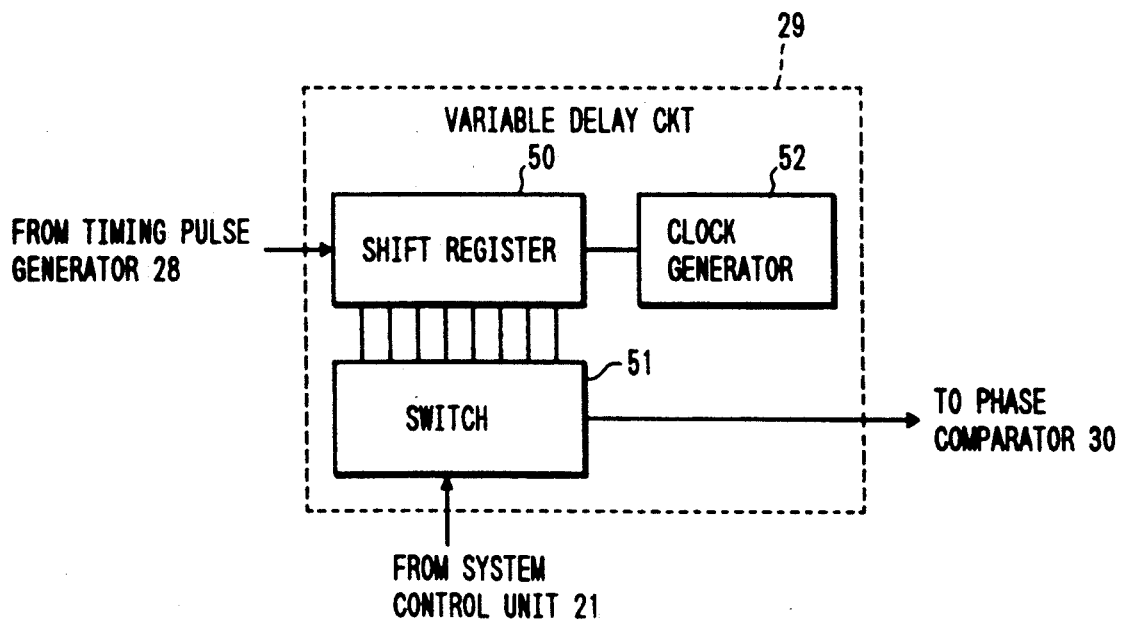
FIG. 6 shows a configuration example of a variable delay circuit 29.

As an example is shown in FIG. 6, the variable delay circuit 29 causes an output pulse of the timing pulse generator 28 to be delayed by a shift register 50, selects the output by a switch 51, and outputs said output to the phase comparator 30. The delay time by the variable circuit 29 can be set to a desired value under control of a system control unit 21. By controlling the delay time, the tape traveling phase can be controlled. The delay time is generally set to a fixed value.

Reel motor drivers 45 and 46 drive the reel motors 41 and 42. The tension of the tape is detected by the tension sensor 43, and the result detected by a tension detector 44 is outputted to the reel motor driver 45. The reel motor driver 45 controls the reel motor 41 on the basis of this input data so that the tension of the tape is fixed.

The system control unit 21 of FIG. 1 switches the entire recorder to the recording mode or the play back mode by a control signal outputted from an operating panel 18 or from a control input terminal 19 and an interface 20, and performs editing such as inserting edit or assembling edit by such a signal.

As mentioned above, since the value of the variable delay circuit 29 is generally set to a fixed value, the magnetic head traces the predetermined track. An editing command such as inserting edit or assembling edit is issued to the system control unit 21, and the preroll point (a point where the play back operation starts prior to recording) on the tape is set at the position of the play back head. Then, the recorder enters the play back state and the system control unit 21 detects the output levels of the recording heads REC1 to REC4 by the level detection circuit 16. The system control unit 21 changes the output to the variable delay circuit 29, thus changing the tracking, detects the output of the level detection circuit 16, determines an output to the variable delay circuit 29 when said output is maximized, and fixes the value of the variable delay circuit 29 to said output value.

In this case, it is desirable to use outputs of a plurality of recording heads as shown in the present embodiment and to allow every head to track optimumly. However, by using a specific head selectively, the necessary performance can be obtained.

When the tape reaches the inserting edit or assembling edit start point, the system control unit 21 switches the recorder from the play back state to the recording state. When the tape reaches the inserting edit or assembling edit end point, the system control unit 21 switches the recorder from the recording state to the play back state, and terminates inserting edit or assembling edit. Generally, a control signal is newly recorded during assembling edit, while, during inserting edit, video data or audio data is inserted and recorded in the portion where the control signal is recorded, and the operation of the servo unit 17 in the play back state is left unchanged. When an operation to change the tape speed for editing during the play back operation starting at the preroll point and to match the phases of two digital video tape recorders performing editing with each other or a phase adjustment operation is provided, an operation for placing the recording head on the recorded track (controlling the variable delay circuit 29 to maximize the recording head output) must be performed by the system control unit 21 after the phase adjustment operation is finished.

Figure 5:
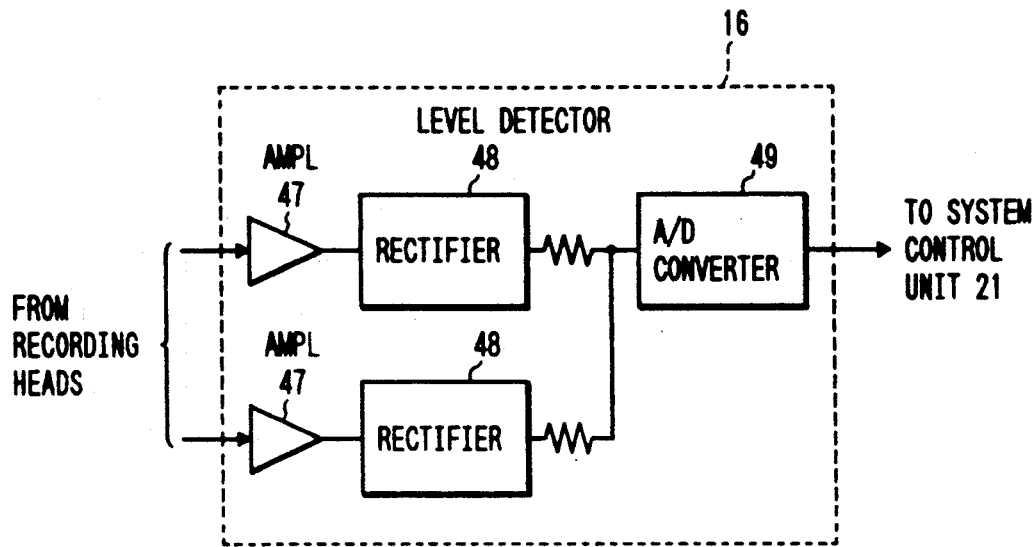
FIG. 5 is a block diagram indicating a configuration example of a level detection circuit 16.

Next, an example of the level detection circuit 16 will be described with reference to FIG. 5. In FIG. 5, the recording head output obtained from the cylinder 1 is amplified by an amplifier 47, rectified by a rectifier 48, averaged, converted from analog to digital by an analog to digital converter 49, and outputted to the system control unit 21.

In this invention, it is desirable to control the recording heads to be placed on the recorded track only during editing. This is because it is required in other than the edit mode to output the value obtained during manufacture of the digital video tape recorder to the variable delay circuit 29 and to record said value in the track position at the time of adjustment during manufacture. It is possible to optimize (readjust) the recording head position (the track position as specified) of the digital video tape recorder, which is operated as usual with a test tape, by a command from the operating panel 18 or elsewhere using the above means and to allow the system control unit 21 to store the value and to output said value when the digital video tape recorder is actually operated. This method allows the recording track position to be easily maintained.

When the output value to the variable delay circuit 29 after the recording head position for editing is optimized exceeds a predetermined value, the system control unit 21 can issue an alarm to the operator on the assumption that the track position of the recorded tape is extremely deviated from the specified one. This method provides an advantage to easily detect a tape which does not satisfy the recording format.

Next, other effects produced by detecting outputs of the recording heads REC1 to REC4 by the level detection circuit 16 will be described. The first effect is that if the output of the level detection circuit 16 does not exceed a predetermined value when the tracking is changed while the system control unit 21 is performing the above operation during editing, the system control unit 21, assuming that the recording head cannot record correctly because of being clogged or worn excessively, stops the editing operation immediately and warns the operator of said error. This method prevents the editing from being performed by defective records and improves the reliability.

The second effect is that a recording head error can also be found by monitoring the recording head output independently of the edit mode. In this case, by simultaneously monitoring the output levels of the play back heads PB1 to PB4, an error in not only the recording heads but also the play back heads to be paired up can be detected. This is a convenient method for maintaining the recorder.

As mentioned above, the present invention guarantees the continuity of the track position at the joint in the inserting edit or assembling edit mode and improves the quality of play back images.

I claim:

1. A digital video tape recorder comprising:
   means for recording digital data by dedicated recording heads;
   means for playing back said digital data by dedicated play back heads;
   means for allowing a magnetic tape to travel;
   means for allowing said magnetic heads to track said magnetic tape;
   means for detecting the output levels of said heads;
   means for changing the tracking of said magnetic heads; and
   means for effecting a changing tape speed operation of said magnetic tape to synchronize a tape position to an input signal to be recorded when performing joint recording for enabling editing to be performed;
   wherein said means for changing the tracking is configured to be controlled after the changing tape speed operation for editing is finished.

2. A video tape recorder comprising:
   transporting means for transporting a magnetic tape;
   recording means for recording a video signal on the magnetic tape with a recording head in a recording mode;
   play back means for playing back the video signal recorded on the magnetic tape with a play back head and detecting the video signal recorded on the magnetic tape with the recording head in a play back mode;
   level detecting means for detecting a level of the video signal detected by the recording head in the play back mode;
   tracking position changing means for changing a tracking position of the recording head on the magnetic tape in response to a tracking control signal;
   tracking control means for controlling the tracking position changing means to position the recording head at an optimum tracking position in a tracking control operation, including (a) means for generating a tracking control signal and supplying the tracking control signal to the tracking position changing means, (b) means for changing a value of the tracking control signal, thereby controlling the tracking position changing means to change the tracking position of the recording head, while monitoring the level detected by the level detecting means until the detected level reaches a maximum level, at which point the value of the tracking control signal is an optimum value representing an optimum tracking position of the recording head, and (c) means for setting the value of the tracking control signal to the optimum value, thereby controlling the tracking position changing means to position the recording head at the optimum tracking position; and editing control means for controlling the video tape recorder to record a video signal on the magnetic tape in an editing operation in an editing mode, including (a) means for controlling the transporting means to transport the magnetic tape beginning at a pre-roll point located a predetermined distance ahead of an editing start point, (b) means for controlling the transporting means to adjust a transport speed of the magnetic tape to enable the editing operation to be performed accurately, (c) means for preventing the tracking control means from performing the tracking control operation until after the transport speed of the magnetic tape has been adjusted, and (d) means for controlling the recording means to record a video signal on the magnetic tape with the recording head beginning at the editing start point and ending at an editing stop point.

3. A video tape recorder according to claim 2, wherein the editing control means further includes means for issuing an alarm if the optimum value of the tracking control signal exceed a predetermined value.

4. A video tape recorder according to claim 2, wherein the editing control means further includes means for stopping the editing operation if the level detected by the level detecting means does not exceed a predetermined level during the tracking control operation.

5. A video tape recording according to claim 2, wherein the tracking control means further includes means for setting the value of the tracking control signal to a predetermined value representing a predetermined tracking position of the recording head in a mode other than the editing mode, thereby controlling the tracking position changing means to position the recording head at the predetermined tracking position.

6. A video tape recorder comprising:

transporting means for transporting a magnetic tape;

recording means for recording a video signal on the magnetic tape with a recording head in a recording mode;

play back means for playing back the video signal recorded on the magnetic tape with a play back head and detecting the video signal recorded on the magnetic tape with the recording head in a play back mode;

level detecting means for detecting a level of the video signal detected by the recording head in the play back mode;

tracking position changing means for changing a tracking position of the recording head on the magnetic tape in response to a tracking control signal; and tracking control means for controlling the tracking position changing means to position the recording head at an optimum tracking position in a tracking control operation, including (a) means for generating a tracking control signal and supplying the tracking control signal to the tracking position changing means, (b) means for changing a value of the tracking control signal, thereby controlling the tracking position changing means to change the tracking position of the recording head, while monitoring the level detected by the level detecting means until the detected level reaches a maximum level, at which point the value of the tracking control signal is an optimum value representing an optimum tracking position of the recording head, (c) storing means for storing the optimum value of the tracking control signal, and (d) means for setting the value of the tracking control signal to the optimum value stored in the storing means, thereby controlling the tracking position changing means to position the recording head at the optimum tracking position.

* * * * *